United States Patent
Wille et al.

(10) Patent No.: US 8,544,935 B2
(45) Date of Patent: Oct. 1, 2013

(54) DOOR IMPACT BEAM

(75) Inventors: Andreas Wille, Paderborn (DE);
Dariusz Straznikiewicz, Paderborn (DE); Andreas Schiller, Lippstadt (DE)

(73) Assignee: Benteler Automobiltechik GmbH, Paderborn (DE)

( * ) Notice: Subject to any disclaimer, the term of this patent is extended or adjusted under 35 U.S.C. 154(b) by 95 days.

(21) Appl. No.: 13/156,919

(22) Filed: Jun. 9, 2011

(65) Prior Publication Data
US 2012/0146359 A1    Jun. 14, 2012

(30) Foreign Application Priority Data
Jun. 10, 2010  (DE) .......................... 10 2010 023 325

(51) Int. Cl.
*B60J 5/00* (2006.01)

(52) U.S. Cl.
USPC ...................... 296/146.6; 49/502; 296/187.12

(58) Field of Classification Search
USPC ........... 296/146.6, 146.5, 146.7, 155, 187.03; 293/102, 120; 49/502
See application file for complete search history.

(56) References Cited

U.S. PATENT DOCUMENTS

| | | | |
|---|---|---|---|
| 4,948,196 A | 8/1990 | Baba et al. | |
| 6,572,178 B2 | 6/2003 | Haertel et al. | |
| 6,663,169 B2 * | 12/2003 | Gehringhoff et al. | 296/187.12 |
| 6,869,130 B2 * | 3/2005 | Bodin et al. | 296/146.6 |
| 7,086,686 B2 * | 8/2006 | Bullmann et al. | 296/146.6 |
| 7,093,886 B2 * | 8/2006 | Blust et al. | 296/146.6 |
| 7,188,877 B2 | 3/2007 | Gonzales et al. | |
| 7,357,430 B2 * | 4/2008 | Karlander | 293/102 |
| 7,357,432 B2 * | 4/2008 | Roll et al. | 293/133 |
| 7,422,252 B2 | 9/2008 | Gouillart et al. | |
| 7,611,175 B2 * | 11/2009 | Tornberg | 293/102 |
| 2006/0131927 A1 * | 6/2006 | Blust et al. | 296/146.6 |
| 2007/0000709 A1 | 1/2007 | Danger et al. | |
| 2009/0162688 A1 | 6/2009 | Handing et al. | |
| 2009/0236163 A1 | 9/2009 | Wibbeke et al. | |

FOREIGN PATENT DOCUMENTS

| | | |
|---|---|---|
| DE | 196 54 376 A1 | 6/1998 |
| WO | WO 94/07709 | 4/1994 |

* cited by examiner

*Primary Examiner* — Glenn Dayoan
*Assistant Examiner* — Pinel Romain
(74) *Attorney, Agent, or Firm* — Henry M. Feiereisen LLC

(57) ABSTRACT

A door impact beam for a motor vehicle includes a pot-shaped member made from a metal sheet and extending over a major part of a length of the beam to define two legs and a bridge interconnecting the legs. The bridge has a central length portion which is formed with an embossment defined by a depth, with a ratio of the depth of the embossment to a height of the pot-shaped member in midsection ranging between 1:3 and 1:6. The pot-shaped member has side flanges extending transversely from lower longitudinal edges of the legs in the central length portion.

21 Claims, 2 Drawing Sheets

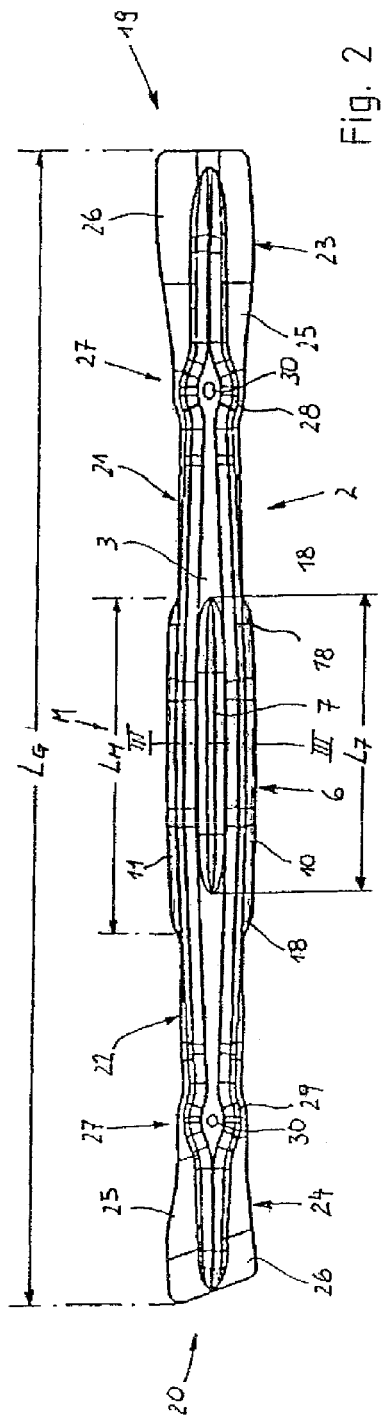
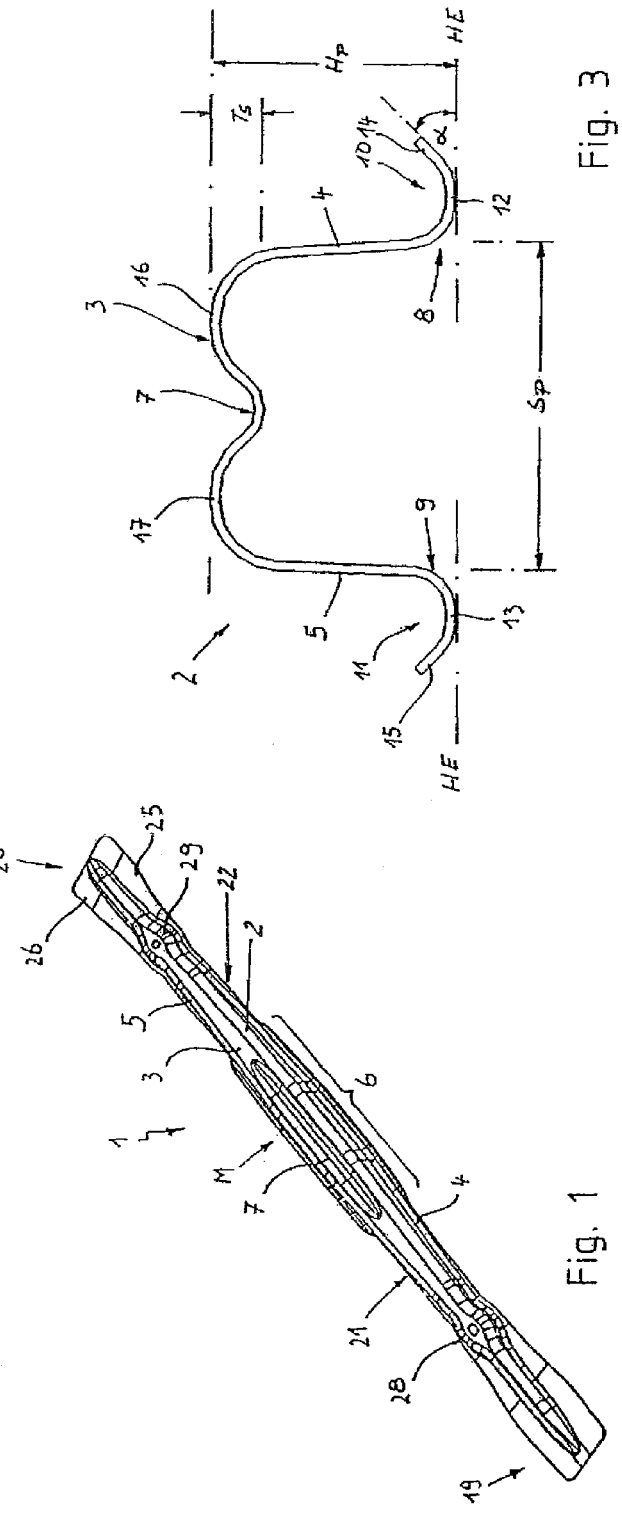

DOOR IMPACT BEAM

CROSS-REFERENCES TO RELATED APPLICATIONS

This application claims the priority of German Patent Application, Serial No. 10 2010 023325.0, filed Jun. 10, 20010, pursuant to 35 U.S.C. 119(a)-(d), the content of which is incorporated herein by reference in its entirety as if fully set forth herein.

BACKGROUND OF THE INVENTION

The invention relates to a door impact beam for installation in a motor vehicle door.

The following discussion of related art is provided to assist the reader in understanding the advantages of the invention, and is not to be construed as an admission that this related art is prior art to this invention.

Door impact beams are used in particular for protection of occupants from injury in a passenger car in the event of an impact from the side. Legislative regulations impose certain minimum requirements as to a push-in resistance at a predefined path for homologation of motor vehicles. The door impact beam absorbs the main forces in the event of a side collision and primarily transfers them via the door hinges and the door lock or also via so-called crash crawls into the motor vehicle body. The same applies for door push-in tests for approval. Such door impact beams are conventionally made of steel sheet of high yield strength so as to exhibit high stiffness transversely to the travel direction.

It would be advantageous and desirable to provide an improved door impact beam to obviate prior art shortcomings.

SUMMARY OF THE INVENTION

According to one aspect of the present invention, a door impact beam for a motor vehicle includes a pot-shaped member made from a metal sheet and extending over a major part of a length of the beam to define two legs and a bridge interconnecting the legs, the bridge having a central length portion formed with an embossment defined by a depth, with a ratio of the depth of the embossment to a height of the pot-shaped member in midsection ranging between 1:3 and 1:6, wherein the pot-shaped member has side flanges extending transversely from lower longitudinal edges of the legs in the central length portion.

The present invention resolves prior art problems by providing a pot-shaped member which expands in its cross-sectional configuration towards the middle of the pot-shaped member and has a central length portion with projecting side flanges as well as an embossment in an upper area of the pot-shaped member in the central length portion to provide reinforcement. The embossment and the side flanges are suited to the required stress behavior and provided only in the central third of the pot-shaped member. As a result, the deformation behavior is uniform and the weight is reduced and optimized at the same time.

As a result of its geometric configuration, the design of the door impact beam is weight-optimized and achieves efficient crash behavior. The midsection of the door impact beam is reinforced by the two side flanges and the embossment. The embossment prevents the upper surface of the door impact beam or the pot-shaped member from premature collapsing when under stress so that the force remains at high level when a longer deformation path is involved. The two side flanges provide stabilization of the lateral legs when the pot-shaped member is under stress and prevent a rapid outward deflection, i.e. spreading apart or buckling, of the legs. As the initial cross section of the pot-shaped member is retained for an extended period in the event of a side impact, the force level remains high for a longer period.

According to another advantageous feature of the present invention, a transition between the bridge and the embossment and a transition between the legs and the side flanges can be configured rounded. Advantageously, the side flanges are curved in an arcuate way.

According to another advantageous feature of the present invention, the side flanges may each have a base extending from the longitudinal edges, respectively, and a free end portion extending the base in an upward direction at an angle in relation to the base.

The presence of the embossment provides the bridge of the pot-shaped member with a wavy configuration to define two arcuate head regions which merge into the embossment and are continued by the straight legs which then connect into the side flanges via the lower, rounded longitudinal edges. The cross section of the pot-shaped member in the central length portion receives thus a double S-shaped configuration in symmetry to a central longitudinal axis with rounded transitions all around.

According to another advantageous feature of the present invention, the central length portion can have a length which corresponds to a third +/−25% of a total length of the beam. Currently preferred is a length which corresponds to a third +/−15% of a total length of the beam.

The cross section of the pot-shaped member can have a height and a width which taper from midsection towards the end portions. As a consequence, the height of the pot-shaped member decreases in the outer length portions, which continue the central length portion, in a direction to the outer ends of the door impact beam. Also the distance between the lower longitudinal edges of the legs decreases in the outer length portions of the door impact beam.

According to another advantageous feature of the present invention, the pot-shaped member has opposite ends which may terminate in widened end portions, respectively. The end portions, may each be configured with a flat flange. They may also be provided with a further bevel to improve attachment to a structure.

According to another advantageous feature of the present invention, the pot-shaped member may include, widened functional regions in a transition zone to the end portions. The functional regions may be widened in relation to the outer length portions and are provided for attachment of the door impact beam within a motor vehicle structure and for enhanced stiffness. Advantageously, the bridge of the pot-shaped member may have an opening in each of the functional regions for passage of installation elements or other components. Also possible is a coupling of further components of installation elements in the openings.

According to another advantageous feature of the present invention, the pot-shaped member may be made of high-strength cold-formed steel. As an alternative, the pot-shaped member may be made of high-strength hot-formed steel and hot-formed and press-hardened. Advantageously, the pot-shaped member may be made of high-strength hot-formed steel with a yield strength of greater than 980 MPa. When selecting high-strength cold-formed steel, the yield strength should be greater than 680 MPa.

In order to optimize weight consideration, the pot-shaped member may also be made of light metal. Suitably, the pot-shaped member can be made of high-strength aluminum with a yield strength of greater than 350 MPa.

According to another advantageous feature of the present invention, the pot-shaped member may be defined along the central length portion by a height and a distance between the legs, with the height, or the distance, or both, varying by +/−10%. Currently preferred is a variation of +/−5%. Variations in height and distance, i.e. width of the pot-shaped member, improve crash behavior.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1 is a perspective illustration of a door impact beam according to the present invention;

FIG. 2 is a plan view of the door impact beam of FIG. 1;

FIG. 3 is a vertical cross section of the door impact beam in the middle of the door impact beam, taken along the line III-III in FIG. 1;

DETAILED DESCRIPTION OF PREFERRED EMBODIMENTS

Figure 4:
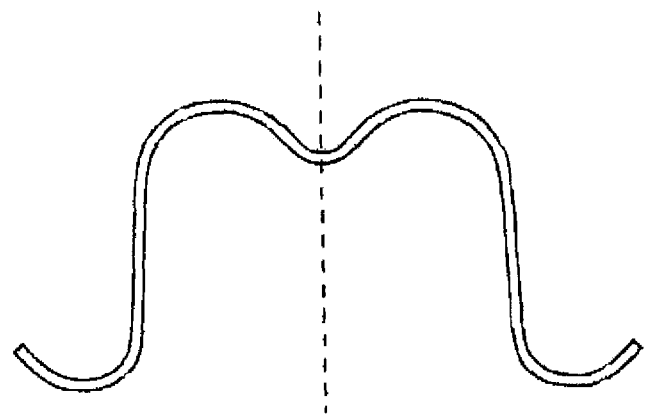
FIG. 4 is a vertical cross section of a variation of a door impact beam.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 5:
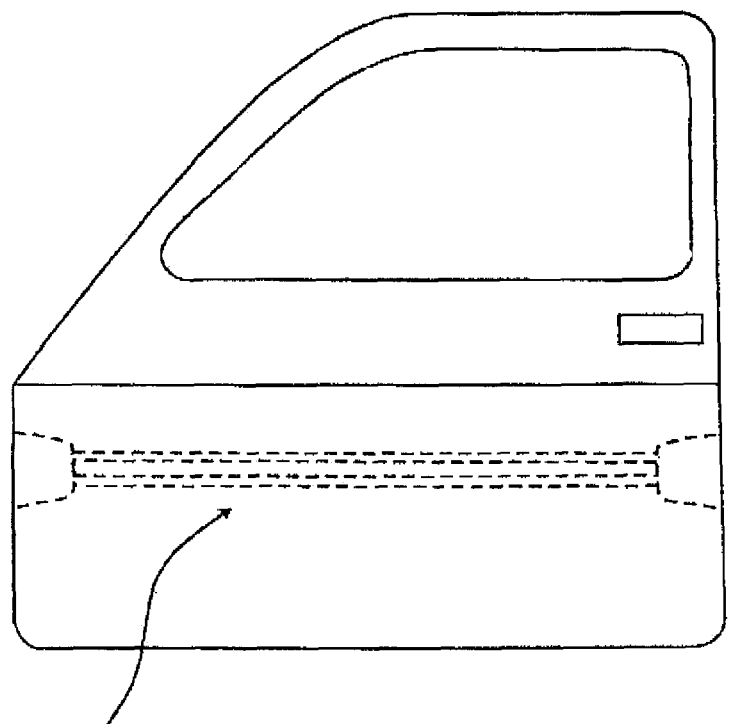
FIG. 5 is a schematic illustration of a vehicle door with incorporated door impact beam.

Turning now to the drawing, and in particular to FIG. 1, there is shown a perspective illustration of a door impact beam according to the present invention, generally designated by reference numeral 1 for incorporation in a vehicle door, as shown in broken lines by way of example in FIG. 5. The door impact beam 1 is made from a metal sheet, advantageously from high-strength cold-formed steel, high-strength hot-formed steel, or high-strength light metal, such as high-strength aluminum. Currently preferred is a door impact beam 1 which is made from high-strength hot-formed steel which is hot-formed and press-hardened in a forming tool.

The door impact beam 1 includes over a major part of its length a profiled member 2 which is pot-shaped in cross section, as best seen in FIG. 3. The pot-shaped member 2 has a bridge 3 and two lateral legs 4, 5 which are interconnected by the bridge 3. The bridge 3 is formed in a central length portion 6 of the door impact beam 1 with an embossment 7. Further provided in the central length portion 6 are side flanges 10, 11 which project transversely from lower, rounded longitudinal edges 8, 9 of the legs 4, 5, respectively. FIG. 4 sows a variation of the pot-shaped member having in cross section a double S-shaped configuration in symmetry to a central longitudinal axis in the central length portion.

The embossment 7 and the side flanges 10, 11 are provided only in the central length portion 6. The side flanges 10, 11 have each a base 12, 13 which is directed outwards from the lower length edges 8, 9 and is continued by a free end portion 14, 15.

As shown in FIG. 3, the free end portions 14, 15 of the side flanges 10, 11 extend upwards at an angle α in relation to a lower horizontal plane HE defined by the bases 12, 13. The angle α may be 45° as shown by way of example. The angle α may range between 30° and 60°.

The presence of the embossment 7 in the central length portion 6 gives the bridge 3 of the pot-shaped member 2 a wavy configuration with two arcuate head portions 16, 17 which merge into the embossment 7 on opposite sides. The head portions 16, 17 are continued on the outside by the straight legs 4, 5.

The side flanges 10, 11 are connected with their ends to the longitudinal edges 8, 9 of the legs 4, 5 via slants 18.

The embossments 7 is depressed inwardly and is defined by a depth $T_S$ which is significantly smaller than a height $H_P$ in the center M of the pot-shaped member 2. The ratio of depth $T_S$ of the embossment 7 to height $H_P$ in the center M of the pot-shaped member 2 ranges between 1:3 and 1:6.

The embossment 7 reinforces the upper region of the pot-shaped member 2. The embossment 7 and the side flanges 10, 11 are suited to the loads at hand and provided only in the central length portion 6 of the door impact beam 1. The length $L_M$ of the central length portion 6 corresponds to a third +/−25% of a total length $L_G$ of the door impact beam 1. Currently preferred is a variation of +/−15%. The embossment 7 has a total length $L_7$ which substantially corresponds to the length $L_M$, although the length $L_7$ may be shorter or also longer than the length $L_M$. As a result of the geometric configuration in accordance with the present invention, the cross section increases towards the center M. Overall, a uniform deformation behavior is realized and the weight of the door impact beam 1 is reduced.

The central length portion 6 of the door impact beam 1 is continued on both sides in the direction of the ends 19, 20 by outer length portions 21, 22. The pot-shaped member 2 is tapered in the outer length portions 21, 22 with respect to its width as well as height. As a consequence, the height $H_p$ of the pot-shaped member 2 decreases in the outer length portions 21, 22. Furthermore, the distance $S_P$ between the lower longitudinal edges 8, 9 of the legs 4, 5 decreases in the area of the outer length portions 21, 22. A weight-optimized and crash-optimized design is obtained in view of the geometry of the door impact beam 1 in accordance with the present invention. The central length portion 6 of the door impact beam 1 is reinforced by the presence of the two side flanges 10, 11 and by the presence of the embossment 7 in the bridge 3 of the central length portion 6. The embossment 7 increases stiffness transversely to the travel direction, whereby the force can be maintained at a high level over a longer deformation path. The two side flanges 10, 11 stabilize the legs 4, 5, when the pot-shaped member 2 is under stress and prevent their rapid collapse or outwards deflection. As a result, the force level remains longer in a higher range so that the initial cross section of the pot-shaped member 2 or of the door impact beam 1 is maintained for a longer period.

The pot-shaped member 2 terminates on both ends 19, 20 in wider end portions 23, 24 which have flat flanges 25, 26, respectively, for support and installation of the door impact beam 1 in a door structure.

As shown in particular in FIG. 2, the pot-shaped member 2 further includes widened pot-shaped functional regions 28, 29 in a transition zone 27 between the outer length portions 21, 22 to the end portions 23, 24, respectively. The bridge 3 has an opening 30 in each of the functional regions 28, 29. The wider functional regions 28, 29 increase transverse stiffness and are provided for mounting and installation of the door impact beam 1 in a door structure, with the openings 30 being used for passage or coupling of installation elements and other components.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. A door impact beam for a motor vehicle, said beam comprising a pot-shaped member made from a metal sheet and extending over a major part of a length of the beam to define two legs and a bridge interconnecting the legs, said bridge having a central length portion formed with an embossment defined by a depth, said pot-shaped member having side flanges extending transversely from lower longitudinal edges of the legs in the central length portion and having a cross section of double S-shaped configuration.

2. The door impact beam of claim 1, wherein a transition between the bridge and the embossment and a transition between the legs and the side flanges are rounded.

3. The door impact beam of claim 1, wherein the side flanges have each a base extending from the longitudinal edges, respectively, and a free end portion extending the base in an upward direction at an angle in relation to the base.

4. The door impact beam of claim 1, wherein the angle ranges between 30° and 60°.

5. The door impact beam of claim 1, wherein the longitudinal edges have a curved configuration.

6. The door impact beam of claim 1, wherein the central length portion has a length which corresponds to a third +/−25% of a total length of the beam.

7. The door impact beam of claim 1, wherein the central length portion has a length which corresponds to a third +/−15% of a total length of the beam.

8. The door impact beam of claim 1, wherein the beam has outer length portions respectively provided on both ends of the central length portion, with a height of the pot-shaped member decreasing in the outer length portions.

9. The door impact beam of claim 1, wherein the legs are spaced from one another at a distance which decreases in outer length portions of the pot-shaped member.

10. The door impact beam of claim 1, wherein the pot-shaped member has opposite ends terminating in widened end portions, respectively.

11. The door impact beam of claim 10, wherein each of the end portions is configured with a flat flange.

12. The door impact beam of claim 10, wherein the pot-shaped member includes widened functional regions in a transition zone to the end portions.

13. The door impact beam of claim 12, wherein the bridge of the pot-shaped member has an opening in each of the functional regions.

14. The door impact beam of claim 1, wherein the pot-shaped member is made of high-strength cold-formed steel.

15. The door impact beam of claim 1, wherein the pot-shaped member is made of high-strength hot-formed steel and hot-formed and press-hardened.

16. The door impact beam of claim 1, wherein the pot-shaped member is made of light metal.

17. The door impact beam of claim 1, wherein the pot-shaped member is made of high-strength aluminum.

18. The door impact beam of claim 1, wherein the pot-shaped member is defined along the central length portion by a height and a distance between the legs, with at least one member selected from the group consisting of the height, and the distance varying by +/−10%.

19. The door impact beam of claim 1, wherein the pot-shaped member is defined along the central length portion by a height and a distance between the legs, with at least one member selected from the group consisting of the height, and the distance varying by +/−5%.

20. The door impact beam of claim 1, wherein the double S-shaped configuration is configured in symmetry to a central longitudinal axis in the central length portion.

21. The door impact beam of claim 20, wherein a ratio of the depth of the embossment to a height of the pot-shaped member in midsection ranges between 1:3 and 1:6.

* * * * *